United States Patent
Carr et al.

(10) Patent No.: US 12,504,452 B2
(45) Date of Patent: Dec. 23, 2025

(54) ELECTRIC METER BODY

(71) Applicants: Trilliant Networks Inc., Cary, NC (US); Wasion International, Hunan (CN)

(72) Inventors: James Riley Carr, Holly Springs, NC (US); Tian Zhong Ping, Hunan Province (CN); Lyu Xin Wei, Hunan Province (CN); Yangyong Jiang, Hunan Province (CN)

(73) Assignees: Trilliant Networks Inc., Cary, NC (US); Wasion International, Hunan (CN)

( * ) Notice: Subject to any disclaimer, the term of this patent is extended or adjusted under 35 U.S.C. 154(b) by 155 days.

(21) Appl. No.: 18/382,865

(22) Filed: Oct. 23, 2023

(65) Prior Publication Data

US 2024/0272211 A1 Aug. 15, 2024

Related U.S. Application Data

(60) Provisional application No. 63/444,752, filed on Feb. 10, 2023.

(51) Int. Cl.
*G01R 22/06* (2006.01)
(52) U.S. Cl.
CPC .................. *G01R 22/065* (2013.01)
(58) Field of Classification Search
CPC ..... G01R 22/065; G01R 11/24; G01R 22/066
USPC ........................................................ 324/156
See application file for complete search history.

(56) References Cited

U.S. PATENT DOCUMENTS

| | | | | |
|---|---|---|---|---|
| 2,359,628 A | * | 10/1944 | Daly ..................... | G01R 11/04 |
| | | | | 324/156 |
| 4,162,516 A | * | 7/1979 | Becker ................... | H02B 1/03 |
| | | | | 361/666 |
| 4,660,126 A | * | 4/1987 | Koster ................... | G01R 31/11 |
| | | | | 361/728 |
| 5,049,810 A | * | 9/1991 | Kirby ................... | G01R 22/065 |
| | | | | 324/156 |

(Continued)

OTHER PUBLICATIONS

Trilliant Staff, Trilliant Announces Libra Smart Electricity Meter, Empowering Utilities and the New Energy Economy, Dec. 3, 2020, 5 pages, https://trilliant.com/triliant-announces-libra-smart-electricity-meter-empowering-utilities-and-the-new-energy-economy/, Toronto, Canada.

(Continued)

*Primary Examiner* — Christopher P Mcandrew
(74) *Attorney, Agent, or Firm* — Moser Taboada

(57) ABSTRACT

Embodiments of an electric meter are described herein. In some embodiments, the electric meter includes a meter body suitable to enclose an electric meter assembly, engageable with a meter socket which cannot be removed from the meter socket without breaking of a first seal. The electric meter also includes an outer cover engaged with the meter body to be removable from the meter body without removal of the meter body from the meter socket and without breaking of the first seal, wherein the meter body and the outer cover are dimensioned and arranged such that removal of the outer cover from the meter body provides access to test, repair manipulate, or replace one or more internal components disposed on or within the meter body.

17 Claims, 3 Drawing Sheets

(56) References Cited

U.S. PATENT DOCUMENTS

| | | | | |
|---|---|---|---|---|
| 5,088,004 | A * | 2/1992 | Howell | H02B 1/03 361/672 |
| 5,207,595 | A * | 5/1993 | Learmont | G01R 11/04 439/517 |
| 5,423,695 | A * | 6/1995 | Robinson | H01R 13/6397 439/95 |
| 6,475,028 | B1 * | 11/2002 | Robinson | H01R 33/94 439/135 |
| 6,488,535 | B1 * | 12/2002 | Robinson | H01R 33/94 439/508 |
| 6,663,422 | B1 * | 12/2003 | Robinson | H01R 33/945 361/666 |
| 6,684,670 | B1 * | 2/2004 | Agbay | E05B 67/365 70/164 |
| 6,798,191 | B1 * | 9/2004 | Macfarlane | G01R 22/065 324/156 |
| 7,479,029 | B2 * | 1/2009 | Cook | G01R 11/04 361/664 |
| 7,650,767 | B2 * | 1/2010 | Robinson | G01R 11/04 70/164 |
| 7,746,246 | B2 * | 6/2010 | Salser, Jr. | G01D 4/002 324/156 |
| D629,366 | S * | 12/2010 | Ericson | D13/156 |
| 9,124,078 | B2 * | 9/2015 | Zhang | H02B 1/03 |
| 2005/0122094 | A1 * | 6/2005 | Robinson | G01R 22/065 324/156 |
| 2005/0239325 | A1 * | 10/2005 | Cook | G01R 11/04 439/517 |
| 2012/0140381 | A1 * | 6/2012 | Stachowiak, Jr. | H02B 1/03 361/672 |
| 2013/0088214 | A1 * | 4/2013 | Walser | G01R 11/04 324/156 |
| 2013/0279086 | A1 * | 10/2013 | Lalancette | G01R 11/04 361/662 |
| 2019/0139379 | A1 * | 5/2019 | Siglock | G01R 22/066 |
| 2021/0109142 | A1 * | 4/2021 | Karlgaard | G01R 11/04 |
| 2022/0187348 | A1 * | 6/2022 | Agarwal | H05K 5/0208 |

OTHER PUBLICATIONS

Trilliant Libra Smart Electric Meter, https://trilliant.com/librameter/, 3 pages.
Trilliant® Libra Series Edge Ready Smart Electric Meter, •https://link.edgepilot.com/s/99d16e27/ZbX-Vdn1Qkih2yolFHUbSg?u=https://trilliant.com/wp-content/uploads/2020/11/Datasheet-Trilliant-Libra-Series-Smart-Electric-Meter.pdf, 4 pages, Cary, North Carolina.
Trilliant® Libra Series Edge Ready Smart Electric Meter Specifications, •https://link.edgepilot.com/s/8c064dce/hXDG-DQALK0GmYB1tkVteNw?u=https://trilliant.com/wp-content/uploads/2020/11/Specification-Trilliant-Libra-Series-Smart-Electric-Meter.pdf, Oct. 8, 2020, 37 pages, Cary, North Carolina.

* cited by examiner

ELECTRIC METER BODY

CROSS-REFERENCE TO RELATED APPLICATION

This application claims priority to U.S. Provisional Patent Application No. 63/444,752 filed on Feb. 10, 2023, which is herein incorporated in its entirety by reference.

FIELD

Embodiments of the present disclosure are generally directed to electric meters and housings for use with electric meters for use in residential and industrial applications. In particular, electric meters and corresponding housings or bodies suitable for use in North America which conform with the ANSI C12 standard for electric metering.

BACKGROUND

Electrical power supplied per phase for residential and industrial applications is alternating current power, also referred to as "line power" or "mains power". To measure the consumption of electricity, a meter is provided at the electrical service entrance to the premises. There are generally three types of meters: (1) electromechanical based meters; (2) electronic meters; and (3) hybrid electromechanical/electronic meters. Most meters currently in use are electronic meters or hybrid electromechanical/electronic meters comprising various electronic circuit boards, current sensors, voltage sensors, and the like, which are associated with various electronic components and assemblies to provide electronic communication with the power companies, regulatory entities, and the customers of the electric power.

These electronic components and assemblies require maintenance, which may include replacement, and/or programing updates, initialization and marriage procedures, calibration, upgrading, and the like, as well as adaptation to provide various forms of electronic communication which is subject to significant changes as technology advances. Most electronic meters also require a battery or other form of power storage to preserve programming in the event of a power failure. Maintenance and servicing of electric meters requires access to the internal workings of the electric meter at different levels, which currently requires removal of the meter and corresponding disconnection of electric power from the end user. There are also regulatory issues associated with removal of an electric meter from service that may include the need to return the meter to an appropriate authority to recalibrate the meter or other verification requirements to meet regulatory mandates. Accordingly, conducting simple maintenance on the meter may result in service interruption for the end user, the expense, manpower and delay of having to replace an otherwise functioning meter with another meter due to regulatory mandates, and delay for the consumer. In addition, servicing electric meters which are in use may present safety concerns due to the presence of line voltage and line current present within the meter.

Removal of an electric meter from service to perform maintenance results in both inconvenience for the end user, regulatory issues for the service provider, and cost and manpower which are ultimately borne by the end user. The inventors have discovered an electric meter which allows for the safe and efficient providing of service to electric meters without having to remove the meter from service.

SUMMARY

In embodiments, an electric meter, comprises a meter body suitable to enclose an electric meter assembly, engageable with a meter socket which cannot be removed from the meter socket without breaking of a first seal; an outer cover engaged with the meter body to be removable from the meter body without removal of the meter body from the meter socket and without breaking of the first seal; wherein the meter body and the outer cover are dimensioned and arranged such that removal of the outer cover from the meter body provides access to test, repair, manipulate, or replace one or more internal components disposed on or within the meter body.

In embodiments, a method of providing electric power comprises directing electric power comprising line voltage and line amperage from a supply, through an electric meter assembly to an end user, wherein the electric meter comprises a meter body suitable to enclose an electric meter assembly, engageable with a meter socket which cannot be removed from the meter socket without breaking of a first seal; an outer cover engaged with the meter body to be removable from the meter body without removal of the meter body from the meter socket and without breaking of the first seal; wherein the meter body and the outer cover are dimensioned and arranged such that removal of the outer cover from the meter body provides access to test, repair, manipulate, or replace one or more internal components disposed on or within the meter body.

In embodiments, a method of servicing an electric meter comprises removing an outer cover from a meter body of the electric meter without breaking a first seal, and testing, repairing, or replacing one or more internal components disposed on or within the meter body, wherein the electric meter comprises the meter body enclosing an electric meter assembly, engageable with a meter socket which cannot be removed from the meter socket without breaking of the first seal; the outer cover engaged with the meter body to be removable from the meter body without removal of the meter body from the meter socket and without breaking of the first seal; wherein the meter body and the outer cover are dimensioned and arranged such that removal of the outer cover from the meter body provides access to test, repair or replace the one or more internal components disposed on or within the meter body and/or manipulating one or more faceplate controls for diagnostics and programming disposed on or within the meter body without access to components carrying line voltage or line current.

DESCRIPTION OF THE DRAWINGS

So that the manner in which the above recited features of embodiments of the instant disclosure can be understood in detail, a more particular description of the embodiments, briefly summarized above, may be had by reference to embodiments, some of which are illustrated in the appended drawings. It is to be noted, however, that the appended drawings illustrate only illustrative embodiments of this disclosure and are therefore not to be considered limiting of its scope.

DETAILED DESCRIPTION

The following definitions are provided in order to aid those skilled in the art in understanding the detailed description.

As used herein, "line voltage" or "line current" refers to the power supplied to the end user, which in North America ranges between 69V and 600V alternating current at amperages from about 10 amps to 320 amps and above.

Figure 1A:
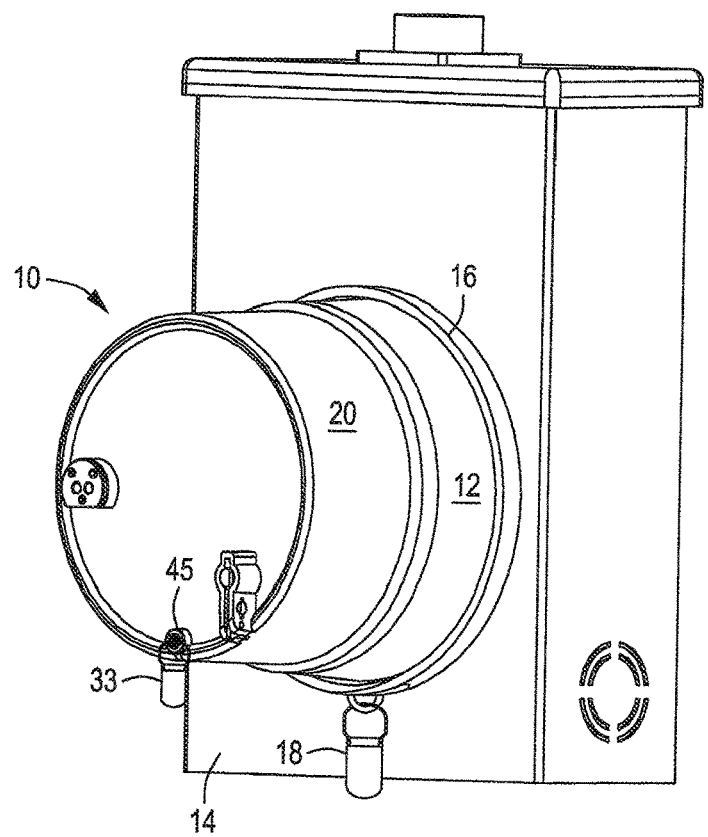
FIG. 1A depicts a side perspective view of an electric meter engaged with a meter socket according to embodiments disclosed herein.
Figure 1B:
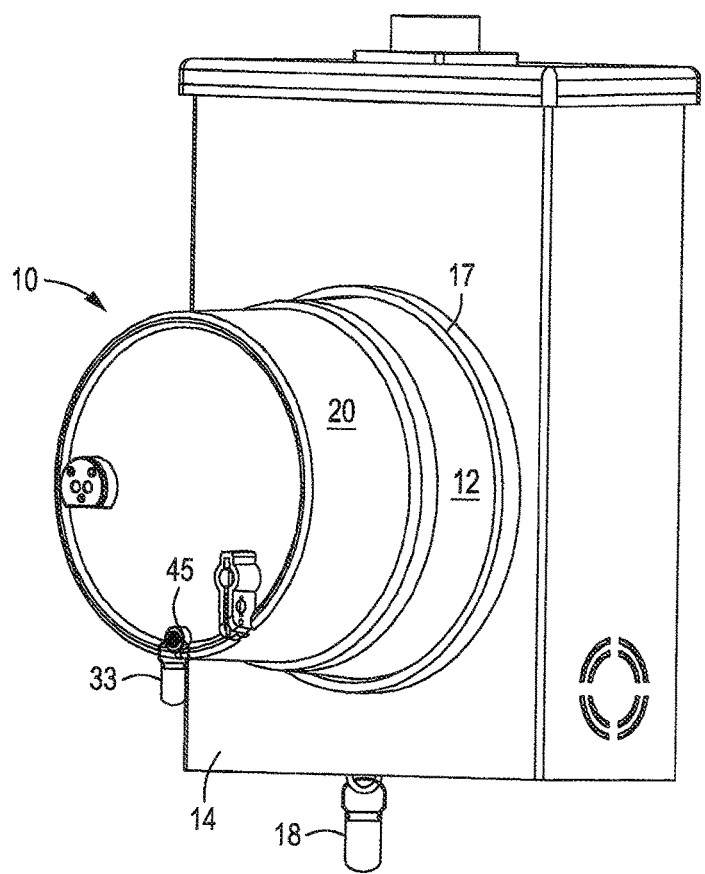
FIG. 1B depicts a side perspective view of an electric meter engaged with a meter socket wherein a portion of the meter assembly is secured by the service can enclosing the meter socket.

For purposes herein, it is to be understood that reference to an electric meter which is engageable with a meter socket includes, or may be limited to refer to an ANSI meter socket according to the standards as set out by the American National Standards Institute as they relate to the C12 "Smart Grid Meter" standard, also abbreviated herein as ANSI C12. An ANSI C12 meter socket refers to the interconnect device to which line voltage is attached, dimensioned and arranged to accept and engage a corresponding electric meter. At the time of this writing, all ANSI C12 meters have a generally round cross-section and the embodiments disclosed herein refer to parameters consistent with this round shape. However, it is to be understood, that the meter may have any shape as may be dictated by the various government and standards organization. Likewise, embodiments disclosed herein are not limited to having an overall round cross-section. For example, a round electric meter body may require a "ring" to attach the housing to a corresponding meter socket as shown in FIG. 1A, and/or a portion of the electric meter body may be disposed within and secured by a cover of the meter socket, also referred to as the service can, i.e., under a cover of a service can, such that the electric meter cannot be removed from the meter socket without breaking of the first seal as depicted in FIG. 1B. However, for purposes herein, and as is contemplated herein, a meter body with a square cross section would require a corresponding square shaped "ring" to attach the meter to a meter socket having a corresponding square shaped attachment point. For brevity, it is to be understood that reference to a ring for attaching the meter body to a corresponding meter socket refers to any shaped "ring", as well a service can lid dimensioned and arranged to secure a portion of the meter assembly within the service can, preventing the removal of the meter from the service can without breaking of a first seal.

Reference to a "first seal" refers to a breakable seal which is attached to either the electric meter or to the service can, such that to remove the electric meter from service e.g., removal from a meter socket, the first seal must be broken. Examples of first seals include a thin wire or plastic material sized to fit through a hole in a retaining threaded member of a sealing ring or a locking tab of a service can, which engages an electric meter with a meter socket. The breakable first seal is dimensioned and arranged such that once engaged, e.g., via crimping or another method, the first seal cannot be removed without breaking of the first seal such that in order to remove the electric meter from the socket, it is necessary to break the first seal before the electric meter can be extracted from the meter socket.

In embodiments, the electric meter may further include a second seal which is distinct from the first seal. The second seal is dimensioned and arranged or engaged with the electric meter to prevent intrusion into internal components of the electric meter, e.g., removal of an outer cover according to embodiments disclosed herein, but which must not be broken to remove the electric meter from service and which may be removed without breaking of the first seal.

In embodiments, the electric meter may further include a third seal which are distinct from both the second seal and the first seal. The third seal is dimensioned and arranged or engaged with the electric meter to prevent intrusion into internal components of the electric meter, which line current or line voltage flow through, which is required for calibration of the actual metering apparatus of the meter.

In embodiments, an electric meter comprises a meter body suitable to enclose an electric meter assembly, engageable with a meter socket which cannot be removed from the meter socket without breaking of a first seal; an outer cover engaged with the meter body to be removable from the meter body without removal of the meter body from the meter socket and without breaking of the first seal; wherein the meter body and the outer cover are dimensioned and arranged such that removal of the outer cover from the meter body provides access to test, repair manipulate, or replace one or more internal components disposed on or within the meter body.

In embodiments, the outer cover is engaged with the meter body via a threaded member disposed through a portion of the outer cover which engages with the meter body.

In some embodiments, at least a portion of the outer cover is optically transparent. In some embodiments, the outer cover is arranged coaxially about at least a portion of the meter body. In embodiments, the meter body comprises an attachment protrusion disposed proximate to a first end of the meter body, extending away from an outer side of the meter body, engageable with the meter socket, and an outer cover attachment assembly spaced away from the attachment protrusion along the outer side of the meter body, engageable with the outer cover.

In embodiments, the electric meter further comprises an intrusion indication sensor, which is activated when the outer cover is removed from the meter body.

In embodiments, a portion of the outer cover frictionally engages with a corresponding portion of the meter body to secure the outer cover to the meter body.

In embodiments, the electric meter is dimensioned and arranged such that removal of the outer cover provides access to the one or more components disposed on or within the meter body, and prevents access to components of the electric meter assembly carrying line voltage and/or line current.

In embodiments, the electric meter is dimensioned and arranged such that removal of the outer cover allows for removal and replacement of one or more electronic assemblies, communication assemblies, a battery, a display assembly, manipulation of faceplate controls for diagnostics and programming, or a combination thereof, disposed on or within the meter body.

In embodiments, the outer cover engages with the meter body to provide an ingress protection of IP 54 or higher.

FIG. 1A depicts an electric meter 10, which also may be referred to herein as the electric meter, comprising a meter body 12 suitable to enclose an electric meter assembly, engageable with a meter socket 14 via an attachment ring 16 comprising a breakable first seal 18, which may be provided by a power provider, which must be broken to remove the electric meter 10 from the meter socket 14. The electric meter 10 further includes an outer cover 20 disposable over at least a portion of the meter body 12, removable from the meter body 12 without removal of the meter body 12 from the meter socket 14, and without removal of the attachment ring 16 or breaking of the first seal 18. The meter body 12 and the outer cover 20 dimensioned and arranged such that removal of the outer cover 20 from the meter body 12 provides access to test, repair, and/or replace one or more components disposed on or within the meter body 12, and/or manipulate one or more faceplate controls disposed within the meter body for diagnostics and programming. In embodiments, the electric meter 10 may further include a second seal 33 which must be broken to remove the outer cover 20 from the meter body 12, but which must not be broken in order to remove the meter body 12 from the meter socket 14. As shown, the outer cover 20 may be engaged with the meter body 12 via a threaded member 45 disposed through a portion of the outer cover 20 which engages with the meter body 12.

FIG. 1B depicts an embodiment wherein the meter body 12 is suitable to enclose an electric meter assembly, which protrudes through a corresponding hole 17 in the cover of the meter socket 14, hole 17 in the cover dimensioned to prevent the electric meter 10 from being disengaged with a meter socket 14 via a protrusion which prevents the meter body 12 from being removed from the meter socket 14. In the embodiment shown in FIG. 1B, the meter socket 14 comprises a breakable first seal 18 which must be broken to allow the electric meter 10 to be removed from the meter socket 14. In embodiments, the protrusion which engages the meter body 12 within the hole 17 thereby preventing the meter body 12, and therefore the electric meter 10 from being removed from the meter socket 14, may be the same protrusion which in other embodiments engages the attachment ring 16.

Figure 2:
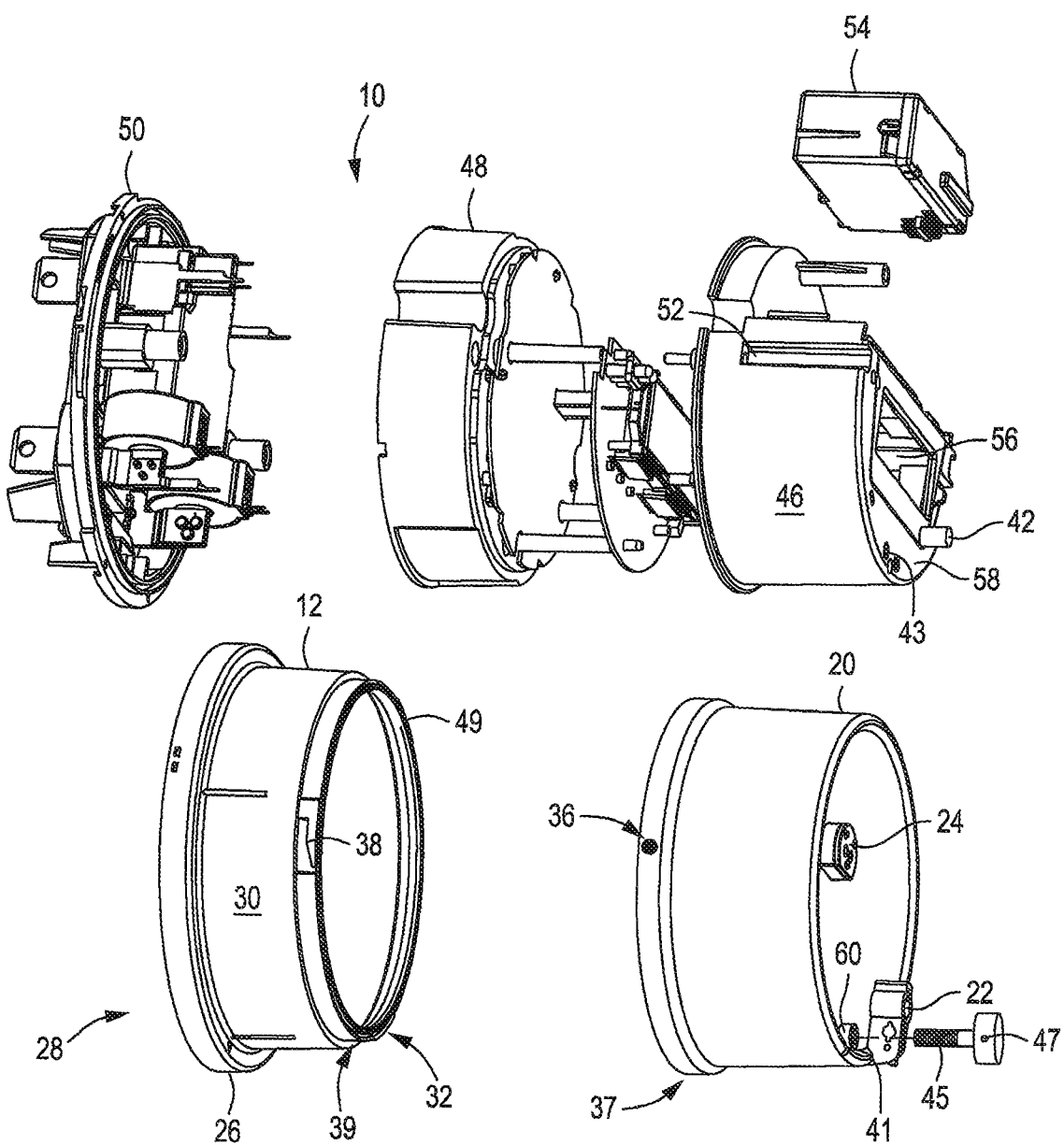
FIG. 2 depicts an exploded view of an electric meter according to embodiments disclosed herein.

As shown in FIG. 2, depicting an exploded view of an electric meter 10 according to embodiments disclosed herein, in embodiments at least a portion of the outer cover 20 is optically transparent. As is further indicated in FIG. 2, the outer cover 20 may further include one or more externally accessible controls 22, and/or an optical data port 24, or the like. In embodiments, the outer cover 20 is arranged coaxially e.g., along a common center axis, about at least a portion of the meter body 12.

In embodiments, the meter body 12 comprises an attachment protrusion 26 radially disposed about a first end 28 of the meter body 12, extending away from an outer side 30 of the meter body 12, which may be engageable with the attachment ring 16 (see FIG. 1A) or engageable within a hole 17 disposed within the cover of the meter socket (see FIG. 1B) to engage the meter body 12 with the meter socket 14, and an outer cover attachment assembly 32 spaced away 34 (see FIG. 3) from the attachment protrusion 26 along the outer side 30 of the meter body 12, which may include a recessed groove 39 engageable with an attachment end 37 of the outer cover 20.

In embodiments, the attachment end 37 of the outer cover 20 frictionally engages with a corresponding portion of the meter body 12, e.g., engagement tab 36 frictionally engages and/or interlocks with the outer cover attachment assembly 32 to secure the outer cover 20 to the meter body 12. This frictional engagement may include the outer cover comprising threads disposed therein that correspond to threads extending away from the meter body 12, or vice-versa. In other embodiments, as shown in FIG. 2, the outer cover 20 includes engagement tabs 36, which interlock with corresponding slots or openings 38 disposed into the meter body 12. In an alternative embodiment, or in addition to the outer cover 20 interlocking with the meter body 12, the outer cover may be releasably engaged with the meter body using a sealing ring (not shown), which may include a second seal, but which is removable without disconnecting the meter from service i.e., disengaging the meter from the meter socket and breaking of the first seal.

As shown in FIG. 2, in embodiments the electric meter 10 further comprises an intrusion indication sensor 42, e.g., a spring-loaded switch, a proximity sensor, a hall effect sensor, and/or the like, which is activated when the outer cover 20 is removed from the meter body 12. In embodiments, the intrusion indication sensor 42 is engaged with circuitry configured to alert the power supplier or another when the outer cover 20 has been removed.

As shown in FIG. 2, in embodiments the electric meter 10 is dimensioned and arranged such that removal of the outer cover 20 provides access to the one or more components disposed on or within the meter body 12, e.g., within one or more electronic assemblies 46 and/or on one or more mounting brackets 48 to allow servicing, replacement, or other activities, and which further prevents access to components of the electric meter assembly 50 which carries line voltage and line current.

In embodiments, the electric meter assembly 50 is engaged within one or more enclosures disposed within the meter body 12, rendering components carrying the line voltage and line current inaccessible without removal of the electric meter from service i.e., removal of the electric meter from the meter socket.

In embodiments, the outer cover 20 is engaged with the meter body 12 via a threaded member 45 disposed through a portion of the outer cover 20, which engages a corresponding portion of the meter body 12, e.g., engagement hole 43. As shown in FIG. 2, the threaded member 45 may include a hole 47 through which the second seal may be disposed to engage a corresponding hole 60 disposed through a front face 41 of the outer cover 20, (see FIGS. 1A and 1B).

Figure 3:
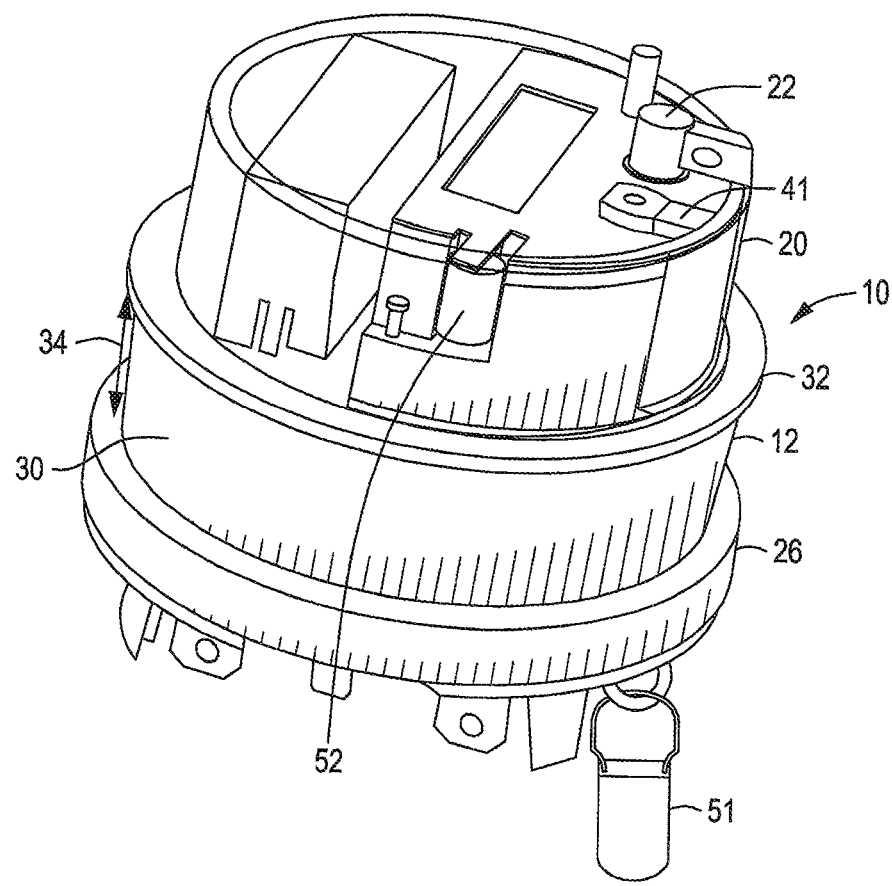
FIG. 3 depicts a side perspective view of an electric meter according to embodiments disclosed herein.

In embodiments, the electric meter 10 is dimensioned and arranged such that removal of the outer cover 20 allows for removal and replacement of one or more electronic assemblies 46, which may include communication assemblies 54, a battery 52 (see FIG. 3), a display assembly 56, and/or manipulation of faceplate controls 58 for diagnostics and programming, or a combination thereof, disposed on or within the meter body 12, e.g., on mounting brackets 48. As shown in FIG. 3, in embodiments, the electric meter 10 may further include a third seal 51 which engages the electric meter assembly 50 with the meter body 12.

In embodiments, the outer cover 20 engages with the meter body 12 to provide an ingress protection of IP-54 or higher, which may include using a deformable seal 49, e.g., an O-ring, a pliable sealing material, and/or the like.

Figure 4:
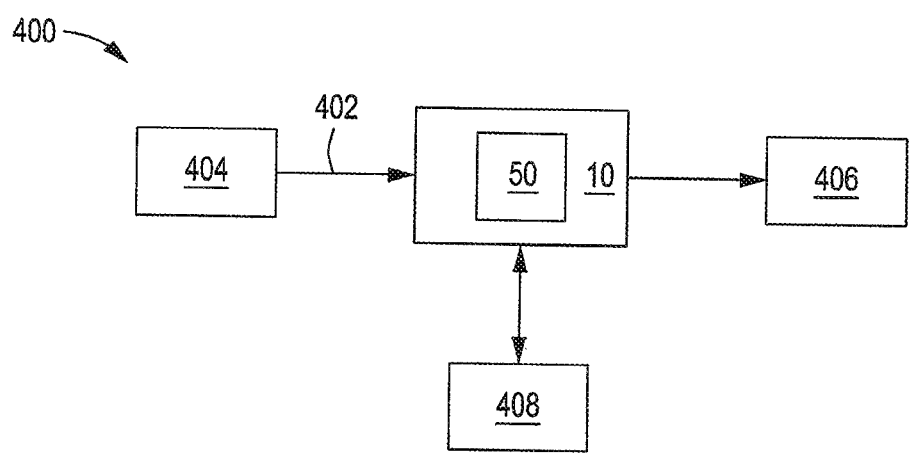
FIG. 4 depicts a block diagram of a method providing electrical power according to embodiments disclosed herein.

As shown in the block diagram of FIG. 4, in embodiments, a method of providing electric power 400 comprises directing electric power comprising line voltage and line current 402 from a power source 404, e.g., the energy power grid, a generator, a battery, and the like, through an electric meter assembly 50, to an end user 406, wherein the electric meter assembly 50 is disposed within an electric meter 10 according to one or more embodiments disclosed herein. In embodiments, the method further comprises servicing 408 the electric meter, which may comprise removing an outer cover from a meter body of the electric meter without breaking a first seal, and testing, repairing, or replacing one or more internal components disposed on or within the meter body to test, repair or replace the one or more internal components disposed on or within the meter body and/or manipulating one or more faceplate controls for diagnostics and programming disposed on or within the meter body without access to components carrying line voltage or line current.

The foregoing disclosure and description of embodiments is illustrative and explanatory thereof and it can be readily appreciated by those skilled in the art that various changes in the size, shape, and materials, as well as in the details of the illustrated construction or combinations of the elements described herein can be made without departing from the spirit of the disclosure.

We claim:

1. An electric meter, comprising:
a meter body suitable to enclose an electric meter assembly, engageable with a meter socket which cannot be removed from the meter socket without breaking of a first seal; and
an outer cover engaged with the meter body to be removable from the meter body without removal of the meter body from the meter socket and without breaking of the first seal,
wherein the meter body and the outer cover are dimensioned and arranged such that removal of the outer cover from the meter body provides access to test, repair manipulate, or replace one or more electronic assemblies, communication assemblies, a display assembly, manipulation of faceplate controls for diagnostics and programming, or a combination thereof, disposed on or within the meter body.

2. The electric meter of claim 1, wherein at least a portion of the outer cover is optically transparent.

3. The electric meter of claim 1, wherein the outer cover is arranged coaxially about at least a portion of the meter body.

4. The electric meter of claim 1, wherein the meter body comprises an attachment protrusion disposed proximate to a first end of the meter body, extending away from an outer side of the meter body, engageable with the meter socket, and an outer cover attachment assembly spaced away from the attachment protrusion along the outer side of the meter body, engageable with the outer cover.

5. The electric meter of claim 1, further comprising an intrusion indication sensor, which is activated when the outer cover is removed from the meter body.

6. The electric meter of claim 1, wherein a portion of the outer cover frictionally engages with a corresponding portion of the meter body to secure the outer cover to the meter body.

7. The electric meter of claim 1, dimensioned and arranged such that removal of the outer cover provides access to the one or more electronic assemblies, communication assemblies, a display assembly, manipulation of faceplate controls for diagnostics and programming, or a combination thereof, disposed on or within the meter body, and prevents access to components of the electric meter assembly carrying line voltage and/or line current.

8. The electric meter of claim 1, wherein the outer cover engages with the meter body to provide an ingress protection of IP 54 or higher.

9. The electric meter of claim 1, wherein the meter socket is an ANSI meter socket.

10. The electric meter of claim 1, wherein outer cover is engaged with the meter body via a threaded member disposed through a portion of the outer cover which engages with the meter body.

11. A method of providing electric power comprising:
directing electric power comprising line voltage and line amperage from a supply, through an electric meter assembly to an end user, wherein the electric meter assembly is disposed with an electric meter comprising:
a meter body suitable to enclose the electric meter assembly, engageable with a meter socket which cannot be removed from the meter socket without breaking of a first seal; and
an outer cover engaged with the meter body to be removable from the meter body without removal of the meter body from the meter socket and without breaking of the first seal,
wherein the meter body and the outer cover are dimensioned and arranged such that removal of the outer cover from the meter body provides access to test, repair, manipulate, or replace one or more electronic assemblies, communication assemblies, a display assembly, manipulation of faceplate controls for diagnostics and programming, or a combination thereof, disposed on or within the meter body.

12. The method of claim 11, further comprising servicing the electric meter, wherein servicing the electric meter comprises:
removing the outer cover of the electric meter without removal of the meter body from the meter socket, and without breaking of the first seal; and
replacing and/or servicing of one or more electronic assemblies, communication assemblies, a display assembly, and/or manipulating one or more faceplate controls for diagnostics and programming disposed on or within the meter body without access to components carrying line voltage or line current, and re-engaging the outer cover with the meter body.

13. The method of claim 11, wherein the meter socket is an ANSI meter socket.

14. A method of servicing an electric meter comprising:
removing an outer cover from a meter body of the electric meter without breaking a first seal, and testing, repairing, or replacing one or more electronic assemblies, communication assemblies, or a display assembly disposed on or within the meter body, and/or manipulate one or more faceplate controls for diagnostics and programming disposed on or within the meter body,
wherein the electric meter comprises:
the meter body enclosing an electric meter assembly, engageable with a meter socket which cannot be removed from the meter socket without breaking of the first seal; and
the outer cover engaged with the meter body to be removable from the meter body without removal of the meter body from the meter socket and without breaking of the first seal,
wherein the meter body and the outer cover are dimensioned and arranged such that removal of the outer cover from the meter body provides access to test, repair or replace the one or more electronic assemblies, communication assemblies, or a display assembly, disposed on or within the meter body and/or manipulating one or more faceplate controls for diagnostics and programming disposed on or within the meter body without access to components carrying line voltage or line current.

15. The method of claim 14, further comprising re-engaging the outer cover with the meter body; and re-engaging the outer cover with the meter body.

16. The method of claim 14, further comprising programming an electronic component disposed on or within the meter body.

17. The method of claim 14, wherein the meter socket is an ANSI meter socket.

\* \* \* \* \*